United States Patent [19]

Blackwell et al.

[11] 4,395,509

[45] Jul. 26, 1983

[54] POLY(ARYLENE SULFIDE) COMPOSITION SUITABLE FOR MOLDING

[75] Inventors: Jennings P. Blackwell; Dale O. Tieszen, both of Bartlesville, Okla.; Jack G. Scruggs, Greenville, S.C.

[73] Assignee: Phillips Petroleum Company, Bartlesville, Okla.

[21] Appl. No.: 354,129

[22] Filed: Mar. 2, 1982

[51] Int. Cl.³ .............................................. C08L 81/04
[52] U.S. Cl. .................................... 524/127; 524/221; 524/223; 524/227; 524/306; 524/315; 524/318; 524/609
[58] Field of Search ............... 524/609, 127, 221, 227, 524/318, 223, 306, 315

[56] References Cited

U.S. PATENT DOCUMENTS

| | | | |
|---|---|---|---|
| 3,236,929 | 2/1966 | Jupa et al. | 264/328.14 |
| 3,468,702 | 9/1969 | Gallaugher et al. | 428/341 |
| 3,837,022 | 9/1974 | Moore | 5/448 |
| 3,997,489 | 12/1976 | Coker | 524/231 |
| 4,017,450 | 4/1977 | Bailey | 524/424 |
| 4,134,874 | 1/1979 | Needham | 524/431 |
| 4,176,098 | 11/1979 | Needham | 524/174 |
| 4,247,598 | 1/1981 | Blackwell | 428/419 |
| 4,304,819 | 12/1981 | Blackwell | 428/419 |
| 4,350,786 | 9/1982 | Blackwell et al. | 524/263 |

*Primary Examiner*—Ronald W. Griffin

[57] ABSTRACT

A composition suitable for molding applications containing from about 30 to about 50 weight percent poly(arylene sulfide), about 10 to about 30 weight percent glass fibers, about 30 to about 60 weight percent of a component chosen from glass beads, fused silica and mixtures thereof, from about 0 to about 3 weight percent colorant, and from about 0.5 to about 2 weight percent of a processing aid chosen from among N,N'-alkylenebis(alkanamides), glycerides and phosphated glycerides of saturated fatty acids containing from 10 to 30 carbon atoms, mono- and dialkanolamides derived from saturated fatty acids and esters derived from a saturated long-chained fatty acid and long-chained saturated aliphatic alcohol. A method for improving processability of a composition containing from about 30 to about 50 weight percent poly(arylene sulfide), from about 10 to about 30 weight percent glass fibers, from about 30 to about 60 weight percent of a component chosen from glass beads, fused silica and combinations thereof and from 0 to about 3 weight percent colorant in which there is admixed with this composition a processing aid in the amount of about 0.5 to about 2 weight percent with the processing aid chosen from N,N'-alkylenebis(alklanamides), glycerides and phosphated glycerides of saturated fatty acids containing from 10 to 30 carbon atoms, mono- and dialkanolamides derived from saturated fatty acids and esters derived from a saturated long-chained fatty acid and long-chained saturated aliphatic alcohol.

11 Claims, No Drawings

POLY(ARYLENE SULFIDE) COMPOSITION SUITABLE FOR MOLDING

BACKGROUND OF THE INVENTION

This invention relates to compositions containing poly(arylene sulfide). In one of its aspects this invention relates to molding compositions containing poly(arylene sulfide). In another of its aspects this invention relates to a method for preparing compositions of improved processability which contain poly(arylene sulfide).

The poly(arylene sulfide) compositions of this invention generally contain substantial amounts of fillers, reinforcing agents, etc., to provide the desired degree of stiffness, crack resistance, impact resistance, and the like, in articles fabricated from them. The fillers, etc., however, decrease the melt flow of the compositions thus increasing the difficulty of molding good parts. It is possible largely to compensate for the melt flow decrease by selecting a poly(arylene sulfide) resin with a high melt flow. Unfortunately, this approach can result in a composition which when molded may exhibit cracking or poorer physical properties than are desired for the proposed end use.

Addition of the specified processing aids to poly(arylene sulfide) compositions by the process of this invention results in improved melt flow for those compositions. It has also been determined that at least some of the processing aids when added to the compositions can also decrease mold corrosion tendencies as compared to compositions containing none of the aids.

It is, therefore, an object of this invention to provide a composition containing poly(arylene sulfide) that is suitable for molding operations and which has good processability characteristics. It is another object of this invention to provide a method for improving the processability of compositions containing poly(arylene sulfide).

Other aspects, objects and the various advantages of this invention will become apparent upon reading the specification and the attached claims.

STATEMENT OF THE INVENTION

According to this invention, a composition is provided that is suitable for use in molding operations. The compositions contains about 30 to about 50 weight percent poly(arylene sulfide), from about 10 to about 30 weight percent glass fibers, about 30 to about 60 weight percent glass beads or fused silica, from about 0 to about 3 weight percent colorant, and from about 0.5 to about 2 weight percent processing aid.

In one embodiment of this invention a method is provided for improving the processability of compositions containing poly(arylene sulfide) in which a composition which contains from about 30 to about 50 weight percent poly(arylene sulfide) resin, about 10 to about 30 weight percent glass fibers, about 30 to about 60 weight percent glass beads or fused silica, and about 0 to about 3 weight percent colorant has blended therein an amount of a processing aid in the range of about 0.5 to about 2 weight percent.

The poly(arylene sulfide) resins employed in the compositions are known polymers which have been set forth, for example, in U.S. Pat. No. 3,354,129 which issued Nov. 21, 1967 to James T. Edmonds, Jr., and Harold Wayne Hill, Jr. The resins are normally solid materials which in an uncured or partially cured state can have melt flows in terms of g/10 minutes according to ASTM Method D-1238-70 (316° C. and 5 kg load) ranging from about 800 to about 10,000, more preferably from about 1000 to about 3500. A presently preferred resin is poly(phenylene sulfide) abbreviated PPS.

The compositions contain from about 30 to about 50 weight percent poly(arylene sulfide) resin, about 10 to about 30 weight percent glass fibers, about 30 to about 60 weight percent glass beads or fused silica, about 0.5 to about 2 weight percent processing aid, and from zero to about 3 weight percent colorant.

The fillers (as well as the other components) utilized in the compositions of this invention are all commercially available materials. Fillers are selected preferably from glass and/or silica but also include others such as clay, talc, calcium carbonate, and the like.

The glass can be used in the form of fibers and this is preferred. In some instances, however, it may be desirable to substitute up to about 75% by weight of the glass fibers with glass beads to modify the effects contributed by the glass. The glass beads are also commercially available materials. Desirably the beads have average diameters ranging from about 10 to about 100 micrometers.

The silica, when employed, can be of natural or synthetic origin. Preferably, a fused (vitreous) silica is used to provide the best results. Fused silica is commercially available as a finely ground material having a relatively narrow particle size distribution ranging from about 1 to about 100 micrometers. It typically contains about 99.5 weight percent $SiO_2$ with the remaining components comprising $Al_2O_3$, $Fe_2O_3$, $Na_2O$ and $K_2O$.

The processing aids of this invention are oils or waxy compound selected from among the N,N'-alkylenebis (alkanamides), glycerides and phosphated glycerides of saturated fatty acids containing from 10 to 30 carbon atoms, mono- and dialkanolamides derived from saturated fatty acids and esters derived from a saturated long chain fatty acid and long chain fatty acid and long chain saturated aliphatic alcohol.

The N,N'-alkylenebis (alkanamides) can be described as

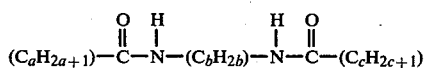

where a and c are integers in the range of 10 to 25, preferably 15 to 20, and b is an integer in the range of 2 to 10, preferably 2 to 6. Examples of specific compounds include N,N'-ethylenebis(undecanamide), N,N'-propylenebis(undecanamide), N,N'-tetramethylenebis-(undecanamide), N,N'-hexamethylenebis(heneicosanamide), N,N'-octamethylenebis(undecanamide), N,N'-decamethylenebis (hexacosanamide), N,N'-ethylenebis(hexadecanamide), N,N'-ethylenebis (heptadecanamide) N,N'-ethylenebis(octadecanamide), N,N'-ethylenebis (nonadecanamide), N,N-ethylenebis-(eicosanamide), N,N'-ethylenebis (heneicosanamide), N,N'-ethylenebis(hexacosanamide), N,N'-trimethylenebis(hexadecanamide), N,N'-propylenebis(-nonadecanamide), N,N'-trimethylenebis(2-methyleicosanamide), N,N'-propylenebis(hexacosanamide), N,N'-tetramethylenebis(hexadecanamide), N,N'-tetramethylenebis(octadecanamide), N,N'-tetramethylenebis(heneicosanamide), N,N'-pentamethylenebis(nonadecanamide), N,N'-pentamethylenebis(- heneicosanamide), N,N'-hexamethylenebis(undecanamide), N,N'-(3-methylpentamethylene) bis(hexadecanamide), N,N'-hexamethylenebis(nonadecanamide), N,N'-hexamethylenebis(hexacosanamide), N,N'-octamethylenebis(nonadecanamide, N,N'-octamethylenebis(hexacosanamide), N,N'-decamethylenebis(undecanamide), N,N'-decamethylenebis(heptadecanamide), N-(3-(4-ethylpentadecanamide)butyl)-2-methyloctadecanamide, and admixtures thereof.

Examples of the glycerides of saturated fatty acids containing from about 10 to 30 carbon atoms include glycerol monodecanoate, glycerol monohexadecanoate, glycerol monooctadecanoate(glycerol monostearate), glycerol monoeicosanoate, glycerol monotriacontanoate, and phosphated glycerol mono- and distearates.

Examples of the mono- and dialkanolamides which can be derived from saturated fatty acids containing from about 10 to 30 carbon atoms and from mono- or diethanolamine and mono- or diisopropanolamine include the mono- and diethanolamides and the mono- and diisopropanolamides of decanoic acid, of octadecanoic acid, of eicosanoic acid (arachidic acid), and of triacontanoic acid (melissic acid).

Examples of the esters which can be derived from saturated fatty acids containing from about 10 to 30 carbon atoms and saturated aliphatic alcohols containing from about 12 to 30 carbon atoms include lauryl caprate, ceryl laurate, myristyl cerotate, cetyl palmitate, stearyl arachidate, and behenyl melissate.

Preferred species from the preceding group of compounds include N,N'-ethylenebis(octadecanamide), glycerol monostearate, monoethanolamide of stearic acid, and cetyl palmitate (hydrogenated sperm wax). A presently preferred compound is N,N'-ethylenebis (octadecanamide), often called N,N'-ethylenebis(stearamide), because it not only provides adequate lubricity to enhance the melt flow properties but also appears to reduce mold corrosion of compositions in which it is contained.

The organic silanes used in the compositions function as coupling agents for the resin and the fillers and also appear to improve the water resistance and decrease the linear coefficient of expansion. Specific examples of compounds include gamma-glycidoxypropyltrimethoxysilane, methyltrimethoxysilane, beta-(3,4-epoxycyclohexyl)-ethyltrimethoxysilane, N-beta(N-vinylbenzylamine) ethyl gamma-amino-propyltrimethoxysilane monohydrogen chloride, and the like. A presently preferred species is the last named compound.

The colorants, when employed, are selected from those inorganic and organic compositions which will tolerate the high molding temperatures to be used. The temperatures can range from about 300° to 600° C. (570°–1110° F.). Suitable colorants include carbon black, titanium dioxide, cadmium sulfide, cadmium sulfoselenide, phthalocyanine blue or green, iron oxide, and the like.

The compositions of the invention can be employed in extrusion and injection molding applications such as in the fabrication of sheets, in the encapsulation of electronic components such as semiconductor devices, etc. The melt flow properties of the compositions can range from about 5 to about 800 g/10 minutes as determined according to ASTM procedure D1238-70 at 316° C. with a 5 kg weight. The higher melt flow compositions, e.g., 400 to 800 g/10 minutes, are preferably employed in injection molding applications. The lower melt flow compositions are more conveniently used in extrusion.

The compositions can be prepared, for example, by first mixing the components together in a rotating drum blender or in an intensive mixer such as a Henschel mixer and then compounding the resulting mixtures above the melting point of the resin by means of an extruder, etc., to produce a uniform blend. The final blend after chopping or pelleting is introduced into the extruder or injection molder as the feed.

EXAMPLE I

A series of formulations, each totaling about 200 g was mixed together manually from PPS, glass beads, fiber glass, and processing aid. Each mixture was then passed through a 1 inch (2.54 cm) diameter, electrically heated extruder at about 315°–325° C. and formed into strands. The strands were ground and run through the extruder again under the same conditions. The product was ground in a mill to obtain the final product in the form of coarse granules.

The melt flow of the PPS powder used was 3100. The glass beads employed are commercially available soda-lime-silica microbeads having a nominal diameter range of about 44–74 micrometers. The glass fiber was ⅛ inch (0.32 cm) chopped glass strands, Owens-Corning 497 BB.

The melt flow of the compositions as well as the melt flow of the PPS are determined in accordance with ASTM D1238-70 at 316° C. and a 5 kg weight.

The compositions employed and their melt flows are given in Table 1.

TABLE 1

Melt Flow of Glass-Filled PPS Compositions

| Run No. | Composition, Parts by Weight | | | Processing Aid | | Melt[a] Flow g/10 min. |
| --- | --- | --- | --- | --- | --- | --- |
| | PPS | Glass Beads | Glass Fiber | Name | PHC[b] | |
| 1 | 40 | 45 | 15 | none (control) | 0 | 285 |
| 2 | 32.5 | 52.5 | 15 | phosphated glycerol mono- and distearates | 1.5 | 300 |
| 3 | 32.5 | 52.5 | 15 | cetyl palmitate | 3.0 | 365 |
| 4 | 35 | 50 | 15 | N,N'—ethylenebis(stearamide) | 1.5 | 430 |
| 5 | 32.5 | 52.5 | 15 | " | 1.5 | 245 |
| 6 | 30 | 55 | 15 | " | 1.5 | 175 |
| 7 | 30 | 55 | 15 | " | 3.0 | 345 |

[a]The extrusion rate of the PPS alone is 47 g/10 min. as determined in accordance with ASTM D1238-70 with orifice of 0.082 ± 0.0002 inches, 1.250 ± 0.002 inches length, 345 g total weight.
[b]Parts by weight per 100 parts by weight composition.

Control run 1 shows that a melt flow of 285 was obtained for a composition containing 60 weight percent glass. A greater glass content can provide good thermal properties and good electrical properties. If the resin content is decreased to yield such compositions then the melt flow of the compositions will also decrease providing the same resin feedstock is employed in all cases.

However, invention runs 2-7 demonstrate that it is possible to increase the glass content up to about 65-70 weight percent in the presence of about 1.5 to 3 parts of specified processing aid per 100 parts composition and still obtain compositions exhibiting melt flows of 300 or higher. Selection of the quantity of processing aid will depend on the quantity of resin present. As the amount of resin increases the amount of processing aid will decrease.

EXAMPLE 2

Another series of compositions was prepared in the manner of Example 1 using 35 weight percent of the same PPS lot as before, 50 weight percent of filler, and 15 weight percent of glass fibers in the absence of both an organic silane and a processing aid. The resulting compositions were tested for melt flow. In addition water extracts of the compositions were tested to determine their electrical conductivities. Each water extract was prepared by refluxing a 0.600 g sample in 60 mL of distilled water for 90 minutes. The cooled solution was centrifuged and about 50 mL of the clear solution was pipetted into a 1 ounce (29.6 mL polyethylene jar. Conductivity was measured by means of a Balsbaugh conductivity cell with cell constant 0.01 cm$^{-1}$ by inserting the probe directly into the sample. For each set of measurements, a blank of 60 mL of water was also determined. For each sample tested, specific conductivity (microsiemens/cm, $\mu$S/cm) equals specific conductivity of the solution minus specific conductivity of the blank.

The results are presented in Table 2.

TABLE 2

Effect of Filler on Melt Flow and Specific Conductivity

| Run No. | Filler Description | Average Particle Size micrometers | Melt Flow g/10 min. | Specific Conductivity $\mu$S/cm |
|---|---|---|---|---|
| 8 | glass beads | 70 | 120 | 25 |
| 9 | fused silica | 30 | 270 | 12 |
| 10 | fused silica | 40 | 240 | 10 |
| 11 | fused silica | 70 | 270 | 12 |
| 12 | crystalline silica | 6 | 135 | 24 |
| 13 | amorphous silica | 1.5 | 295 | 19 |
| 14 | mica(control) | (unknown but finely ground) | 106 | 29 |

The results show in runs 9-11 that the fused silicas all give compositions having decreased water extract conductivities (10-12 $\mu$S/cm) and increased melt flow (240-270 g/10 min) compared to the composition of run 8 formulated with glass beads (25 $\mu$S/cm and 120 g/10 min. melt flow). The crystalline silica in run 12 gives results comparable to the glass beads in run 8. The amorphous silica in run 13 gives the highest melt flow value (295 g/10 min) but its conductivity value (19 $\mu$S/cm) is only marginally better than the glass beads (25 $\mu$S/cm) of run 8. The mica formulation of control run 19 gives the lowest melt flow value (106 g/10 min) and the highest specific conductivity value (29 $\mu$S/cm).

It is believed that compositions employed in electrical applications such as encapsulation that contain fused silica as the filler are preferred over glass beads, mica, crystalline silica, and amorphous silica because of their higher melt flow or/and because of their lower water extract conductivity. It is believed that the fused silica will contribute less conductivity in high humidity situations than the other fillers tested.

EXAMPLE 3

A series of compositions was prepared as before using 35 weight percent of the previously used lot of PPS, 15 weight percent glass fibers, and 50 weight percent fused silica (30 micrometer average particle size). The effect of an organic silane and/or a processing aid in combination with the composition on melt flow and specific conductivity values was subsequently determined.

When used, the organic silane was admixed with the filler by dissolving 1.6 g silane in 200 mL of toluene and wetting the filler with sufficient solution to provide 0.79 weight percent silane on the silica on a solvent-free basis. The solvent was then evaporated under reduced pressure from the mixture.

The results are presented in Table 3.

TABLE 3

Effect of Silane and Processing Aid On Filled PPS Compositions

| Run No. | Silane | Processing Aid[1] | Melt Flow g/10 min. | Specific Conductivity $\mu$S/cm |
|---|---|---|---|---|
| 15 | none | none (control) | 270 | 12 |
| 16 | A[2] | none | 270 | 5 |
| 17 | B[3] | none | 310 | 10 |
| 18 | None | N,N'—ethylene-bis(stearamide) | 530 | 6 |
| 19 | A | N,N'—ethylene-bis(stearamide) | 435 | 4 |
| 20 | B | N,N'—ethylene-bis(stearamide) | 655 | 6 |
| 21 | None | cetyl palmitate | 525 | 3 |
| 22 | A | cetyl palmitate | 445 | 1 |
| 23 | B | cetyl palmitate | 625 | 2 |

[1] 2 parts by weight per 100 parts by weight composition.
[2] Dow Corning Z6040 (epoxy functional)
[3] Dow Corning Z6032, believed to be N—beta(n-vinyl-benzylamine) ethyl gamma-aminopropyltrimethoxysilane monohydrogen chloride.

The results in runs 15-17 show that the silanes contribute little or nothing to melt flow of the compositions but tend to decrease conductivity of the water extracts.

The results in runs 15, 18, 21 indicate that the processing aids apparently decrease conductivity based on the water extract measurements compared to control run 15. The results also suggest some interaction may be occurring between the silanes. Silane A in combination with each processing aid in runs 19,22 gives lower melt flow values (and lower conductivity values) than the corresponding formulations of runs 18, 21 containing processing aid but no silane. In contrast, the compositions containing silane B and a processing aid, runs 20, 23, give higher melt flow values (and equal or lower conductivity values) than the corresponding formulation in the absence of a silane.

EXAMPLE 4

A series of compositions was prepared as before using as the filler either glass beads or a fused silica at the 40 or 50 weight percent level, glass fibers at the 15 weight percent level, and PPS at the 35 or 45 weight percent level. In one set of compositions the same lot of PPS was used as before (melt flow=3100, extrusion rate=47), in another set of compositions the PPS used had an extrusion rate of 77 g/10 minutes, and in a third set of compositions the PPS used had an extrusion rate of 113 g/10 minutes. A processing aid was also employed in several of the compositions. The melt flow of each composition was determined as before.

The results are given in Table 4.

TABLE 4

Effect of PPS Melt Flow on Filled Compositions

| Run No. | PPS Extrusion Rate, g/10 min. | Composition Weight Ratio[1] | Filler Type | Composition Melt Flow, g/10 min. |
|---|---|---|---|---|
| 24 | 113 | 35-50-15 | glass beads | 300 |
| 25 | 47 | 35-50-15 | glass beads | 120 |
| 26 | 113 | 35-50-15 | fused silica[2] | 710 |
| 27 | 77 | 35-50-15 | fused silica[2] | 360 |
| 28 | 47 | 35-50-15 | fused silica[2] | 300 |
| 29 | 77 | 45-40-15 | fused silica[2] | 800 |
| 30 | 47 | 45-40-15 | fused silica[2] | 665 |
| 31 | 77 | 35-50-15[3] | fused silica[2] | 560 |
| 32 | 47 | 35-50-15[3] | fused silica[2] | 475 |

[1] weight ratio of PPS-filler-glass fiber
[2] average particle size of 30 μm
[3] 2 parts by weight cetyl palmitate per 100 parts by weight composition The results demonstrate in runs 24–28, with compositions containing the same filler, that as the melt flow (extrusion rate) of the PPS increases, the melt flow of the composition also increases. As the resin content increases the melt flow of the composition also increases as shown in runs 29, 30. This behavior is expected. Runs 31, 32 show that a processing aid can substantially increase the melt flow of the compositions regardless of the melt flow of the resin employed in formulating the compositions.

EXAMPLE 5

A series of compositions was prepared as before by mixing PPS of 47 extrusion rate (same lot as Example 1), filler or filler mixture containing 0.79 weight percent silane (silane B of Example 3) and 15 weight percent glass fibers. A processing aid, when employed, was used at 2 parts by weight per 100 parts by weight composition (excluding the processing aid). The basic composition consisted of 35 weight percent PPS, 50 weight percent filler, and 15 weight percent glass fibers.

A description of the fillers used and the melt flow results obtained are given in Table 5.

TABLE 5

Effect of Mixed Fillers On Filled PPS Compositions

| | | Melt Flow, g/10 min | |
|---|---|---|---|
| Run No. | Weight Ratio of Filler Components[a] | No Processing Aid | With processing Aid[b] |
| | fused silica 1/fused silica 2 | | |
| 33 | 100/0 | 240 | 475 |
| 34 | 75/25 | 260 | 480 |
| 35 | 50/50 | 230 | 460 |
| 36 | 25/75 | 240 | 490 |
| 37 | 0/100 | 270 | 495 |
| | fused silica 3/glass beads | | |
| 38 | 100/0 | —[c] | 525 |
| 39 | 50/50 | — | 605 |
| 40 | 0/100 | — | 210 |

[a] fused silica 1, 40 μm average particle size
fused silica 2, 70 μm average particle size
fused silica 3, 30 μm average particle size
glass beads, 70 μm average particle size
[b] cetyl palmitate
[c] no composition was prepared Inspection of run 33–37 shows that no improvement in melt flow is obtained using mixtures of silicas of different particle size either in the presence or absence of a processing aid. However, a 50/50 mixture of silica and glass beads did result in a higher melt flow (605 g/10 min., run 39) than an equal weight of glass beads alone (210 g/10 min., run 40) or an equal weight of the silica alone (525 g/10 min., run 38). This represents an unexpected improvement and may be of value in applications where low humidity environments are to be expected.

EXAMPLE 6

Samples of PPS alone, PPS admixed with 1 weight percent lithium carbonate and PPS admixed with 1 weight percent N,N'-ethylenebis(stearamide) were prepared by mixing 10 g of the PPS (nominal melt flow of 140 g/10 min) and 0.1 g of the additive, when used. Each mixture was then used to cover a 1×1 inch (2.5×2.5 cm) mild steel coupon, previously washed with acetone and dried, which was placed on the bottom of a small aluminum pan. The pans were heated for 3 hours at 700° F. (371° C.) in an air oven, removed from the oven and cooled to about 25° C. The melt coupons were broken away from the resin coating and placed on racks over water in an inclosed area for 2 hours at 25° C. The coupons were then placed in new, individual aluminum pans overnight, e.g., 16 hours in the open air. The next day, the coupons were visually inspected for corrosion and rated according to the following arbitrary scale ranging from 1 to 5 where 1 indicates no corrosion and 5 indicates severe corrosion. The control coupon exhibited severe corrosion with the other two coupons showing little or no corrosion. The best results were obtained from the coupon which had been coated with the PPS/N,N'-ethylenebis(stearamide) mixture.

I claim:

1. A composition suitable for molding comprising:
    (a) from about 30 to about 50 weight percent poly(arylene sulfide),
    (b) from about 10 to about 30 weight percent glass fibers,
    (c) from about 30 to about 60 weight percent of a component chosen from glass beads, fused silica and mixtures thereof, and
    (d) from about 0.5 to about 2 weight percent of a processing aid chosen from N,N'-alkylenebis(alkanamides), glycerides and phosphated glycerides of saturated fatty acids, containing from 10 to 30 carbon atoms, mono- and dialkanolamides derived from saturated fatty acids and esters derived from a saturated long-chain fatty acid and long-chain saturated aliphatic alcohol.

2. A composition of claim 1 also containing a finite amount of up to about 3 weight percent colorant.

3. A composition of claim 1 in which the processing aid is N,N'-alkylenebis(alkanamide) described by the formula

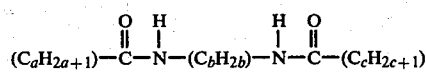

where a and c are integers in the range of 10 to 25, preferably 15 to 20, and b is an integer in the range of 2 to 10, preferably 2 to 6.

4. A composition of claim 1 in which the processing aid is a glyceride of saturated fatty acid.

5. A composition of claim 1 in which the processing aid is a phosphated glyceride of saturated fatty acid.

6. A composition of claim 1 in which the processing aid is chosen from mono- and dialkanolamides derived from saturated fatty acids and esters derived from a saturated long-chained fatty acid and long-chained saturated aliphatic alcohol.

7. A method for improving processability of a composition comprising from about 30 to about 50 weight percent poly(arylene sulfide), about 10 to about 30 weight percent glass fibers, and from about 30 to about 60 weight percent of a component chosen from glass beads, fused silica and mixtures thereof said method comprising the addition to said composition of from about 0.5 to about 2 weight percent of a processing aid chosen from N,N'-alkylenebis(alkanamides), glycerides and phosphated glycerides of saturated fatty acids containing from 10 to 30 carbon atoms, mono- and dialkanolamides derived from saturated fatty acids and esters derived from a saturated long-chain fatty acid and long-chain saturated aliphatic alcohol.

8. A method of claim 7 in which the processing aid is N,N'-alkylenebis(alkanamide) described by the formula

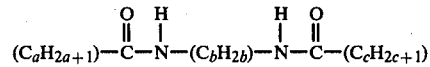

where a and c are integers in the range of 10 to 25, preferably 15 to 20, and b is an integer in the range of 2 to 10, preferably 2 to 6.

9. A method of claim 7 in which the processing aid is a glyceride of saturated fatty acid.

10. A method of claim 7 in which the processing aid is a phosphated glyceride of saturated fatty acid.

11. A method of claim 7 in which the processing aid is chosen from mono- and dialkanolamides derived from saturated fatty acids and esters derived from a saturated long-chain fatty acid and long-chain saturated fatty alcohol.

* * * * *